United States Patent Office 2,789,993
Patented Apr. 23, 1957

2,789,993

PROCESS FOR THE EXTRACTION OF ISANIC ACID FROM VEGETABLE OILS

Edward De Vries, Berchem-Antwerp, Belgium, assignor to Union Chimique Belge, S. A., Brussels, Belgium, a corporation of Belgium No Drawing. Application December 13, 1954, Serial No. 474,992

Claims priority, application Belgium December 22, 1953

5 Claims. (Cl. 260—413)

Isanic acid, melting at 38.8–38.9° C., is a diacetylenic acid, the formula of which is $$CH_2=CH-(CH_2)_4-C\equiv C-C\equiv C-(CH_2)_7-COOH$$

This acid is found in vegetable oils obtained from tropical and equatorial regions.

The extraction of isanic acid from vegetable oils is a difficult operation, in view of the presence of other saturated, ethylenic and acetylenic acids. Hitherto isanic acid has been obtained by extraction or crystallisation of all the fatty acids from the vegetable oil in an appropriate solvent. The yields from these operations are very small. Thus by treating all the acids of 100 g. of boleko oil with petroleum ether not more than 15 g. of isanic acid have been obtained hitherto.

The present invention consists in an extraction process whereby greater quantities of isanic acid may be obtained.

In accordance with the present invention, a vegetable oil is dissolved in an organic solvent; an hydroxide of an alkaline metal, in the solid state, is caused to act upon this solution, in the presence of a quantity of water not exceeding 5%; a precipitate of alkaline soap is formed containing almost the whole of the isanic acid; the reaction mixture is cooled and after separation of the liquid phase, the isanic acid is freed and purified in accordance with known methods.

The solution subjected to the saponification must contain from 10 to 33% of vegetable oil. Beyond these limits the yields of isanic acid decrease appreciably. As solvents there are used especially acetone, isopropyl alcohol and ethyl alcohol. No separation takes place in anhydrous medium, since all the alkaline soaps formed are insoluble. On the other hand the water content of the reaction mixture must not exceed a limit which varies with the nature of the solvent and of the alkaline metal hydroxide utilised. In general, the yield of isanic acid decreases substantially when the reaction mixture contains more than 5% of water. With certain solvents such as acetone and isopropyl alcohol, using caustic potash, this limit is 2.0% and 0.9% respectively.

The quantity of caustic potash or caustic soda used must be between 1.0 times and 1.5 times the theoretical quantity calculated from the saponification index of the vegetable oil.

The saponification is advantageously effected in a very effective mixing apparatus, the moving members of which rotate at a high speed. Thus a rapid and intimate contact is brought about between the oil solution and the solid alkaline hydroxide. In the course of this operation, which only lasts a few minutes, a rise in temperature is observed, due to the exothermic nature of the reaction and to the mechanical friction: the reaction mixture reaches temperatures of the order of 60° C. This mixture is constituted by a precipitate containing especially the alkali isanate and a liquid phase, in which there are to be found glycerol and alkaline soaps of other acids.

It has been observed that the solubility of the alkaline isanates in the solvents used is quite considerable at these high temperatures. In order to effect almost total separation of the isanic acid it is necessary to cool the reaction mixture to below 0° C. After cooling, a precipitate is recovered by using the usual methods such as filtration, centrifuging, etc. Thus it is possible to filter the reaction mixture through a vacuum filter. In the case of potassium soaps it is necessary to effect filtration with exclusion of moisture, due to the hygroscopicity of the separated products.

The precipitate contains, apart from the alkali isanates, soaps of the solid saturated acids.

Among the vegetable oils containing isanic acid mention may be made of boleko oil extracted from the nuts of a tree "Ongueka klaineana" growing in the Belgian Congo. This oil contains 91% of fatty acid with 50–51% of isanic acid.

The following examples relate to the treatment of boleko oil.

Example 1

A dry boleko is taken, having the following characteristics:

| | |
|---|---|
| Acid number | 3.7 |
| Ester number | 183.5 |
| Saponification number | 187.2 |
| Iodine number | 254–259 |

100 gr. of this oil are dissolved in 600 ml. of pure acetone containing less than 0.75% of water. This solution is poured into a grinding-emulsifying apparatus, the blades of which rotate at the speed of 3,000 R. P. M. 24 gr. of caustic potash titrating 85% of KOH are added. The water content of the reaction mixture is lower than 1.20%.

The apparatus is rotated for five minutes after the addition of caustic potash. The temperature of the mixture rises to reach the boiling point of the acetone (57° C.). The mixture is first allowed to cool to room temperature and is then cooled to —3° C. in an ice-box over a period of three hours.

Filtration is effected rapidly over a Buchner filter with exclusion of moisture. The precipitate is taken again and treated with 300 ml. of pure acetone in the saponification apparatus. Cooling is effected as described above. Thereafter the precipitate is filtered and dried on the filter carefully, and subjected to a series of operations which will be described hereinafter. Separately the washing liquid and the first filtrate are reunited; from this mixture the glycerol and the acids (such an isanolic acid) the potassium soaps of which are soluble in acetone can be extracted.

The dried precipitate is dissolved in 500 ml. of water and then 20 ml. of concentrated sulphuric acid are added. The oily phase formed is poured off and the aqueous phase is extracted with ether, which is added to the oily phase. This mixture is evaporated and a residue is obtained weighing 55 gr. The residue is dissolved in 300 ml. of a light fraction of petroleum (boiling between 35 and 70° C.). This solution is cooled to —3° C. The white crystals formed are filtered. 16 gr. of isanic acid melting at 38.8–38.9° C., of great purity are obtained. The iodine number thereof is equal to 273.5 (theoretical value 277.5).

Thereafter the 300 ml. of the light petroleum fraction are concentrated until the volume is reduced to 150 ml. The solution is again cooled to —3° C. and 9 gr. of white crystals are obtained. This is the second yield of isanic acid, melting at 36° C.

This latter filtrate is evaporated under reduced pressure. The more or less dark residue, which weighs 30 gr. has the following characteristics: acid number 220;

ester number 12; iodine number 200. This residue is dissolved in 200 ml. of pure acetone. This solution is treated with 8 gr. of caustic potash in the same manner as at the beginning of this example. Thus 13 gr. of isanic acid melting at about 34° C. are obtained.

This acid and the 9 gr. of second yield acid obtained previously are purified. To this end, the mixture of these acids (9+13 gr.) is dissolved in 100 ml. of a light fraction of petroleum. After cooling to —3° C., 14 gr. of pure isanic acid are obtained, having almost the same characteristics as the 16 gr. obtained directly.

Finally 16+14 or 30 gr. of pure isanic acid are obtained, representing 66% of the quantity in the boleko oil. The yield of crude acid is approximately 85%.

In the residue, after extraction of the isanic acid, there is a small quantity of saturated acid (about 2% of the weight of the oil) and an unidentified acetylenic acid.

On the other hand it is possible to extract from the liquid phase an hydroxylated acetylenic acid, isanolic acid having substantially the same structure as isanic acid.

Example 2

100 gr. of boleko oil are treated in the same manner as in Example 1, with the sole difference that in place of acetone, isopropyl alcohol containing 0.1% of water is taken as solvent. The water content of the reaction mixture is 0.67%. It is observed that the separation of the soaps takes place more easily. The yields are slightly superior to those of Example 1.

Example 3

100 gr. of dry boleko oil are dissolved in 600 ml. of ethyl alcohol at 94% (denaturated with 5% of benzene). This solution is treated with 16 gr. of pure caustic soda containing more than 99% of NaOH. The water content of the reaction mixture is 4.5%. The sodium soaps not being hygroscopic, it is not necessary to effect the filtration with exclusion of moisture. Apart from these differences, the operation is as in Example 1, and the same yields are obtained.

I claim:

1. A process for the extraction of isanic acid contained in vegetable oils, comprising the steps of dissolving a vegetable oil in an organic solvent selected from the group consisting of acetone, isopropyl and ethyl alcohol, the concentration of oil in the solution being between 10 and 33%, causing an alkali hydroxide in the solid state to act upon this solution in the presence of a quantity of water not exceeding 5%, the quantity of alkali hydroxide being between 1.0 and 1.4 times the theoretical quantity calculated from the saponification number of the oil, cooling the mixture to below 0° C., separating the insoluble alkaline soaps and extracting the isanic acid from the latter.

2. A process for the extraction of isanic acid contained in vegetable oils, comprising the steps of dissolving a vegetable oil in an organic solvent selected from the group consisting of acetone, isopropyl and ethyl alcohol, the concentration of oil in the solution being between 10 and 33%, causing an alkali hydroxide in the solid state to act upon this solution in the presence of a quantity of water not exceeding 5%, the quantity of alkali hydroxide being between 1.0 and 1.4 times the theoretical quantity calculated from the saponification number of the oil, the reaction being performed with rapid agitation and the mixture being cooled to below 0° C., separating the insoluble alkaline soaps and extracting the isanic acid from the latter.

3. A process for the extraction of isanic acid contained in boleko oil comprising the steps of dissolving boleko oil in pure acetone containing less than 0.75% of water, the concentration of oil being of 100 grams for 600 milliliters of acetone, causing caustic potash to act upon this solution, 24 grams of caustic potash titrating 85% of KOH being used for 100 grams of boleko oil, the reaction being performed with rapid agitation and the mixture being cooled to below 0° C., separating the alkaline soaps and extracting the isanic acid from the latter.

4. A process for the extraction of isanic acid contained in boleko oil comprising the steps of dissolving boleko oil in isopropyl alcohol containing 0.1% of water, the concentration of oil being of 100 grams for 600 milliliters of isopropyl alcohol, causing caustic potash to act upon this solution, 24 grams of caustic potash titrating 85% of KOH being used for 100 grams of boleko oil, the reaction being performed with rapid agitation and the mixture being cooled to below 0° C., separating the alkaline soaps and extracting the isanic acid from the latter.

5. A process for the extraction of isanic acid contained in boleko oil comprising the steps of dissolving boleko oil in ethyl alcohol, the concentration of oil being of 100 grams for 600 milliliters of ethyl alcohol, causing caustic soda to act upon this solution, 16 grams of pure caustic soda containing more than 99% of NaOH being used for 100 grams of boleko oil, the reaction being performed with a rapid agitation and the mixture being cooled to below 0° C., separating the alkaline soaps and extracting the isanic acid from the latter.

References Cited in the file of this patent

UNITED STATES PATENTS 1,862,037    Schlenker _____ June 7, 1932

OTHER REFERENCES

De Waele: The Analyst, vol. 39, (1914), pages 389–391.

Steger et al.: Fette and Seifen, volume 48 (1941), pages 606–607.

Ralston: Fatty Acids and Their Derivatives, (Copyright 1948), page 285.

Kaufmann et al.: Fette and Seifen, volume 53 (1951), pages 537–542.